United States Patent Office 3,790,511
Patented Feb. 5, 1974

3,790,511
GUM ERASER
Fumio Horie, 22–2, 6-chome, Honkomagome,
Bunkyo-ku, Tokyo-to, Japan
No Drawing. Filed July 12, 1971, Ser. No. 162,024
Claims priority, application Japan, July 13, 1970,
45/60,872; Dec. 24, 1970, 45/116,683; June 15,
1971, 46/42,120
Int. Cl. C08c 17/28; C08d 9/04
U.S. Cl. 260—5                                    3 Claims

ABSTRACT OF THE DISCLOSURE

Gum eraser of an improved quality which is composed of a base rubber material and vulcanized rubber powder particles uniformly dispersed in the base rubber material.

---

This invention relates to a gum eraser. More particularly, it is concerned with gum eraser capable of easily and completely rubbing out not only ordinary inscription with black pencil but also inscriptions done by color pencils, ballpoint pens, or even typewritten letters, and a method for producing such particular gum eraser.

Heretofore, various kinds of specific gum eraser such as, for example, for pencil, typewriter, and so forth have been produced. However, each of these erasers is very limited in its applicability depending on writing instrument used. Take pencils for example. They have very wide range of hardness of lead beginning from 6H hardness to 4B hardness. Therefore, if a gum eraser for a particular hardness of lead is used for erasing inscription made by a pencil of a different lead hardness, it often occurs that not only no perfect erasing can be attained but also written material such as paper is stained. Even if perfect erasure can be attained with such gum erasers, as they are prepared by mixing such material as sands, glass powder, inorganic hard abrasive powder, not only the inscription is rubbed out but also the paper itself is shaved off with the result that papers become considerably damaged, or in some cases, a hole (or holes) are resulted in the paper at a place (or places) where the erasing was done.

Further experimentation was conducted using synthetic resin material. This type of eraser, however, stains the surface of paper depending on the writing article with which inscription is made on the paper, or yields much of its refuse, or changes its quality due to exudation of the plasticizer, etc., all these defects causing the eraser to be practically useless, hence it can not be the eraser of satisfactory quality.

In view of the foregoing problems which have been remaining unsettled so far, it is an object of the present invention to provide a new type of gum eraser which can be used to rub out inscriptions made by any kind of writing material such as black lead pencils, colored pencils, ballpoint pens, typewriter, etc.

It is another object of the present invention to provide a method for manufacturing such gum eraser of improved quality.

The nature, principle and objects of the present invention will become more apparent from the following detailed description thereof in conjunction with preferred examples to reduce it into practice.

As the result of continuous studies and experiments, it has been discovered that a gum eraser containing therein a particular powder particles other than the aforementioned inorganic, hard abrasive powder particles in a certain range of the content thereof is capable of cleanly rubbing out the inscription, by whatever kind of writing article it may be made, through a few repetitions of light rubbing action on the paper surface without causing any damage whatsoever to the paper surface, which has formerly been achieved by time-taking, exhaustive, heavy rubbing action on the paper surface with only poor result.

The gum eraser according to the present invention consists of a base rubber material, nad vulcanized rubber powder particles uniformly dispersed in the base rubber. The vulcanized rubber particles contains therein a vulcanizing agent in an amount somewhat larger than usual. That is, ordinary vulcanized rubber contains less than 5 wt. percent of sulfur for increasing tensile strength and rubber resiliency, and, in some extreme case, the content of the sulfur reaches and exceeds 30 wt. percent for necessity of increased hardness alone. The so-called hard rubber for ordinary use is made up of less than 5 wt. percent of the vulcanizer and a larger quantity of filler, while the rubber vulcanized with more than 30 wt. percent of the vulcanizer is called ebonite (or vulcanite) which is extremely hard and non-resilient, and is distinguished from rubber. The content of the vulcanizer in the vulcanized rubber particles to be used in the present invention excludes the above-mentioned content of "less than 5 wt. percent" and "more than 30 wt. percent" as they are not adequate for the purpose of the present invention. The intended range of the vulcanizer content in the present invention is, therefore, from above 5 wt. percent to below 30 wt. percent, or more preferably from 10 wt. percent to 25 wt. percent.

The rubber material to be used for the vulcanized rubber particles according to the present invention may be either natural or synthetic rubber which is vulcanizable with a vulcanizer and swollen by a volatile organic solvent to be described hereinafter. Accordingly, the vulcanizer for this purpose, besides sulfur, may include zinc white.

The vulcanized rubber particles to be used in the present invention is essentially required to unformly disperse in the base rubber material without being adsorbed thereto. In obtaining such vulcanized rubber particles, the rubber material as vulcanized is swollen with an organic solvent such as trichloroethylene, methyl-ethyl ketone, and other volatile organic solvents, and then pulverized. In one practical way of obtaining the vulcanized rubber particles, any of the above-mentioned solvent is once absorbed in the vulcanized rubber, and then the rubber swollen with the solvent is subjected to crushing by means of a rolling mill, or a ball mill, or other crushing apparatus, whereby the required particles can be easily obtained. The quantity of the solvent to be absorbed into the vulcanized rubber is preferably from 3 to 30 wt. percent to the total quantity of the vulcanized rubber material, and the size distribution of the vulcanized rubber particles is selected within the range of from about 20 to 500 meshes.

In mixing and dispersing the thus obtained vulcanized rubber particles with and into the base rubber material, it is recommendable that this base rubber material may also be swollen with the same kind of solvent as mentioned above relative to the properties of the vulcanized rubber particles and hardness of the base material, which assists mixing and dispersion of the vulcanized rubber particles in an easier and more uniform manner in the base material. However, depending on the kind of rubber materials chosen and hardness thereof, the base material is not necessarily swollen with the solvent, but a sufficient dispersion can be attained.

The base material for the gum eraser consists principally of ordinary natural or synthetic rubber added with various kinds of fillers and compounding material such as sulfur, zinc white, white carbon, white substitute, accelerating agent, stearic acid, and so forth. It is of course possible that a gum plastic such as styrene copolymers or other synthetic high molecular substance is added to the natural rubber, depending on the circumstances.

The quantity of the vulcanized rubber particles to be present in the base rubber material ranges from 15 wt. percent to 90 wt. percent with respect to the total quantity of the base material and the vulcanized rubber particles. No excellent erasing effect can be realized with the mixing ratio of the above-mentioned range.

When the mixed material thus uniformly dispersed is vulcanized by an ordinary vulcanizing method, a gum eraser having an appropriate hardness, granular touch, and fine surface irregularity can be obtained.

In the present invention, there may exist a difference in hardness between the vulcanized rubber particles and the base rubber material. In particular, however, when the vulcanized rubber particles are softer than the base material, easy and perfect erasure can be accomplished, because, at the time of rubbing, the soft component in the gum eraser becomes dejected due to pressure and friction exerted between the eraser and paper surface, and the hard component makes inroad into concaved portions formed by written inscription on the paper surface to uniformly absorb and remove the inscription with ink or pencil without damaging the paper itself, as the vulcanized rubber particles do not possess such hardness as in sand, glass powder, and others.

As mentioned in the foregoing, the vulcanized rubber particles to be used in the present invention function to perfectly remove the written inscription made on the paper. Such remarkable effect can be exhibited by the presence of the above-mentioned vulcanized rubber particles, in which a somewhat larger amount of the vulcanizer than usual is contained.

In order to facilitate reduction into practice of the present invention by persons skilled in the art, the following preferred examples are presented. It should, however, be noted that those examples are illustrative only and do not intend to restrict the scope of the invention as recited in the appended claims.

EXAMPLE 1

The following components were well mixed and kneaded for the vulcanized rubber powder particles.

| | Wt. parts |
|---|---|
| Rubber | 300 |
| Sulfur | 25 |
| Zinc white | 10 |
| Accelerator | 2 |

After the vulcanization of this kneaded mixture, 30 parts by weight of trichloroethylene was added by spraying to the mixture to be absorbed thereinto, thereafter the solvent-swollen vulcanized rubber material was subjected to crushing and pulverizing by means of a rolling mill to obtain powder particles of approximately 100 meshes.

Next, the following components were mixed and kneaded, and 50 parts by weight of trichloroethylene was added to the kneaded mixture and roll-kneaded.

| | Wt. parts |
|---|---|
| Crude rubber | 20 |
| White substitute | 40 |
| Softener | 7 |
| Zinc white | 2 |
| Lithopone | 10 |
| Sulfur | 0.13 |
| Organic accelerator | 0.2 |
| Inorganic accelerator | 5 |
| Calcium carbonate | 4.5 |

To this mixture, 30 parts by weight of the abovementioned vulcanized rubber particles were mixed and sufficiently kneaded, after which trichloroethylene was evaporated and vulcanized, whereby the gum eraser according to the present invention was obtained.

This gum eraser was found to have ordinary hardness, and to be capable of cleanly erasing letters and characters written on the paper surface through a few repetitions of light rubbing action without bringing about any appreciable change to the paper quality.

For comparison, erasure test was conducted with known type of eraser. Inscription written on paper was erased with the rubbing action more than 5 times as many rubbing actions as the instant gum eraser, which resulted in damage to the paper surface.

EXAMPLE 2

The procedures in the above Example 1 was followed except that the following components were mixed and well kneaded, and vulcanized, after which 30 parts by weight of trichloroethylene was absorbed into this kneaded mixture, and the solvent-swollen rubber mixture was pulverized by a crushing and pulverizing apparatus, 100 parts by weight of the vulcanized particles were added to the base rubber material.

| | Wt. parts |
|---|---|
| Rubber (NBR) | 200 |
| Plasticizer (D.O.P.) | 100 |
| Sulfur | 25 |
| Zinc white | 10 |
| Accelerator | 2 |

EXAMPLE 3

The following components were sufficiently mixed and kneaded to be made into a hard, base rubber material.

| | Wt. parts |
|---|---|
| Crude rubber | 13 |
| St-Bu copolymer | 5 |
| Cumaron resin | 10 |
| Softener | 7 |
| White substitute | 30 |
| Zinc white | 2 |
| Titanium or lithopone | 10 |
| Sulfur | 0.13 |
| Organic accelerator | 0.2 |
| Inorganic accelerator | 5 |
| Calcium carbonate | 20 |

Next, the following components were sufficiently mixed and kneaded. Upon completion of vulcanization of the mixture, 30 parts by weight of trichloroethylene was sprayed on the mixture so as to be absorbed well, thereafter the rubber material was subjected to pulverization by means of a roll or other crushing apparatus. Powdery soft rubber material of about 100-mesh size was obtained thereby.

To the prepared hard, base rubber material, 30 parts by weight of the above soft rubber particles was mixed and kneaded sufficiently by a roll or other mixer, and then heated for vulcanization, whereby the gum eraser according to the present invention was obtained.

Trichloroethylene mixed into the soft rubber material may either remain therein or be evaporated by leaving the material in the open atmosphere prior to processing.

The mixing quantity of the soft rubber material may preferably be from 5 to 90 wt. percent with respect to the hard, base rubber material, and the size distribution of the rubber particles ranges from 50 to 500 meshes.

EXAMPLE 4

The following components were sufficiently mixed and kneaded.

| | Wt. parts |
|---|---|
| Rubber | 300 |
| Sulfur | 15 |
| Zinc white | 10 |
| Accelerator | 2 |

Upon completion of vulcanization of the kneaded mixture, 100 parts by weight of trichloroethylene was sufficiently sprayed upon the rubber material. After the solvent was completely absorbed into the rubber material, it was pulverized to a particle size of about 500 meshes by means of a rolling mill.

Next, the following components were mixed and kneaded by a roller to prepare the base rubber material.

|  | Wt. parts |
| --- | --- |
| Crude rubber | 20 |
| White substitute | 40 |
| Softener | 7 |
| Zinc white | 2 |
| Lithopone | 5 |
| Titanium white | 5 |
| Sulfur | 0.13 |
| Organic accelerator | 0.2 |
| Inorganic accelerator | 5 |
| Calcium carbonate | 4.5 |

To this kneaded mixture, 50 parts by weight of the previously prepared vulcanized rubber particles were further mixed and kneaded sufficiently, followed by the vulcanization of the whole batch, whereby the gum eraser according to the present invention was obtained.

This gum eraser was found to have ordinary hardness of eraser, and to be capable of cleanly erasing letters and characters inscribed on the paper surface through a few repetitions of light rubbing action without affecting the paper to any appreciable degree.

For comparison, erasure test was conducted with known type of eraser. Inscrpitions on the paper were erased with rubbing action which took more than 5 times as long as with the instant gum eraser, which resulted in damage to the paper surface.

EXAMPLE 5

The procedures in the above Example 4 was followed except that the following components were mixed and well kneaded, and vulcanized, after which 100 parts by weight of trichloroethylene was sufficiently absorbed into the kneaded mixture, and the solvent-swollen rubber mixture was pulverized by a crushing and pulverizing apparatus. 50 parts by weight of the vulcanized rubber particles were used for mixing with the base rubber material.

|  | Wt. parts |
| --- | --- |
| Rubber (NBR) | 200 |
| Plasticizer (D.O.P.) | 100 |
| Sulfur | 10 |
| Zinc white | 7 |
| Accelerator | 2 |

What I claim is:

1. A method for producing a gum eraser which comprises the steps of:

(a) preparing a base rubber material by mixing and kneading a rubber material selected from the group consisting of natural rubber, NBR (nitrile-butadiene rubber) and a mixture thereof, a sulfur crosslinking agent, a filling agent, and an accelerator;

(b) preparing a base rubber material by mixing and mixing and kneading a rubber selected from the group consisting of natural rubber NBR (nitrile-butadiene rubber) and a mixture thereof, a vulcanizer which is capable of also serving as a crosslinking agent, and an accelerator, then vulcanizing the kneaded mixture, thereafter adding to the vulcanized rubber material an organic volatile solvent selected from the group consisting of trichloroethylene and methyl-ethyl ketone at a ratio of from 3 to 30% by weight in respect to the total quantity of the vulcanized rubber material to swell the material due to absorption of the solvent, and pulverizing the solvent-swollen rubber material to a size distribution of from about 20 to 500 meshes, the content of said vulcanizer in said vulcanized rubber particles being from above 5 to below 30% by weight;

(c) mixing and uniformly dispersing 15 to 90% by weight of said vulcanized rubber powder particles in said base rubber material without the former being absorbed to the latter; and (d) vulcanizing the base rubber material and the vulcanized rubber powder particles dispersed therein.

2. The method according to claim 1, in which the base rubber material is swollen beforehand by the organic volatile solvent for easiness in dispersing the vulcanized rubber particles in said base rubber material.

3. The method according to claim 1, in which a plasticizer is added to prepare the vulcanized rubber powder particles in step (b).

References Cited

UNITED STATES PATENTS

| 2,643,234 | 6/1953 | Backus | 260—5 |
| 3,115,178 | 12/1963 | Tomarkin | 260—5 |
| 3,344,094 | 9/1967 | De Gaugue | 260—5 |
| 3,562,193 | 2/1971 | Leeks et al. | 260—5 |

JOHN C. BLEUTGE, Primary Examiner

U.S. Cl. X.R.

260—32.8 A, 33.8 UA, 41.5 R, 727, 729, 829, 894